United States Patent [19]
Kinoshita et al.

[11] Patent Number: 5,159,452
[45] Date of Patent: Oct. 27, 1992

[54] VIDEO SIGNAL TRANSMITTING METHOD AND EQUIPMENT OF THE SAME

[75] Inventors: Taizo Kinoshita, Musashimurayama; Yoshizumi Eto, Sagamihara, both of Japan

[73] Assignee: Hitachi, Ltd., Tokyo, Japan

[21] Appl. No.: 604,638

[22] Filed: Oct. 22, 1990

[30] Foreign Application Priority Data

Oct. 27, 1989 [JP] Japan .................................. 1-278593

[51] Int. Cl.$^5$ .......................... H04N 7/04; H04N 7/08
[52] U.S. Cl. ................................... 358/141; 358/142; 370/94.1; 370/91; 371/37.1; 371/38.1; 371/39.1
[58] Field of Search ................. 358/141, 142, 12, 133, 358/135, 136; 370/94.1, 91, 92; 371/37.1, 38.1, 39.1, 30

[56] References Cited

U.S. PATENT DOCUMENTS

| | | | |
|---|---|---|---|
| 4,661,956 | 4/1987 | Izumita et al. | 371/37.1 |
| 4,670,881 | 6/1987 | Imoto | 371/37.1 |
| 4,688,225 | 8/1987 | Fukami et al. | 371/37.1 |
| 4,760,576 | 7/1988 | Sako | 371/39.1 |
| 4,779,276 | 10/1988 | Kashida et al. | 371/37.1 |
| 4,956,709 | 9/1990 | Richer et al. | 358/147 |
| 4,996,690 | 2/1991 | George et al. | 371/37.1 |

FOREIGN PATENT DOCUMENTS 0062287  1/1985  Japan .................................. 358/142

Primary Examiner—Tommy P. Chin
Assistant Examiner—Michael H. Lee
Attorney, Agent, or Firm—Antonelli, Terry, Stout & Kraus

[57] ABSTRACT

A video signal transmitting method comprising: a sending method including the steps of: dividing an analog video signal in a unit corresponding to integer times of a number of bits composing an information field of one packet in packet transmission and converting into a digital video signal, forming a digitalized video signal into a plurality of packets, forming a plurality of packets into a first packet block in M lines × N columns, adding an error correction code which corrects a longitudinal error of data in a first packet block as a second packet block in P lines × N columns in an (M+1)th line and thereafter, and sending a packet; and a receiving method including the steps of: recomposing the same packet block as that composed on a sending side from plurality of received packets, recovering a video signal with packet loss information from an exchange and an error correction code formed into a packet, and regenerating an analog video signal from a digital video signal after recovery.

15 Claims, 7 Drawing Sheets

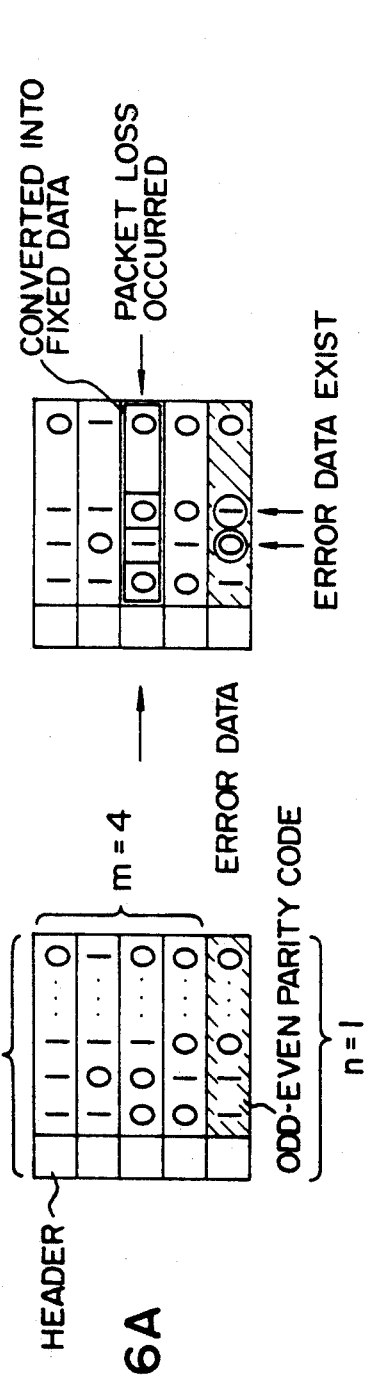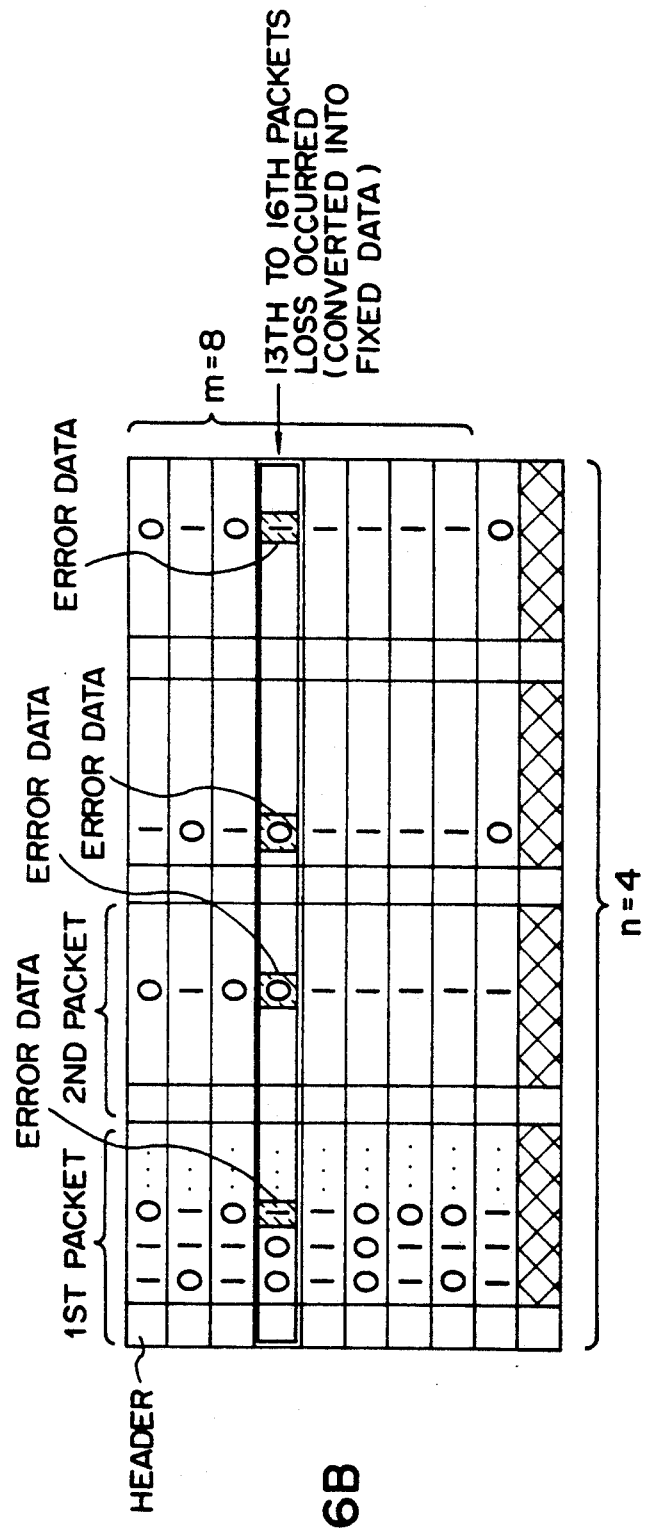
FIG. 6A
FIG. 6B

VIDEO SIGNAL TRANSMITTING METHOD AND EQUIPMENT OF THE SAME

BACKGROUND OF THE INVENTION

The present invention relates to a method of transmitting a digital video signal through an Asynchronous Transfer Mode (ATM) or a packet switching system, and more particularly to an video signal transmitting method which is suited to reduce degradation of a video on a receiving side when a packet loss (abandonment) is generated on a transmission line.

In packet transmission or a signal transmitting method of transmission in an ATM system, digital information to be transmitted is divided into certain information quantity, and divided digital information is sent in a transmission unit called a packet or a cell (named generically a packet). A packet is composed of a header portion having a fixed length including a packet number, a destination, a parity bit and the like and an information field which is information to be transmitted. That is, digitalized video information is divided by a number of bits which form an information field of a packet, and each division is transmitted as one packet after being added with a header portion.

Conventionally, in a signal transmitting method of packet transmission or transmission by an ATM system of a digital video signal through a packet switching system, synchronization such that a break of a video line (horizontal scanning line), a frame and the like and a break of a packet are in accord with each other has not been taken into consideration, but an analog video signal and a digital video signal formed in a packet have been independent of each other.

With such a composition of a packet, when an error or a loss of data in packet unit is generated on a transmission line, it has been unable to recover such an error or a loss appropriately on a receiving side.

That is, an error on a transmission line occurs at random, and an error rate in bit unit is at a sufficiently low value, 1 bit or less per $10^9$ bits, but a packet loss is generated in passing through a packet switching system. For example, packet abandonment occurs due to restriction of traffic volume. In case a packet is abandoned because delay of a packet becomes too much, a burst error in which a plurality of packet becomes too much, a burst error in which a plurality of packets are abandoned is produced in many cases. Even one packet includes several tens of bytes and several packets includes several hundreds of bytes. Accordingly, there has been such a problem that, when a packet loss is produced, picture quality degradation which is detected visually is caused in case a transmission signal covers video information. In video signal transmission of conventional technology, a lost packet number can be detected. In a regeneration portion, however, fixed data are only input in place of a lost packet, and it has been unable to recover to such an extent that picture quality degradation is not caused by error correction or interpolation as video data.

SUMMARY OF THE INVENTION

It is an object of the present invention to realize a video signal transmitting method which is able to make picture quality degradation of a video due to the packet loss inconspicuous, that is, to realize a video signal transmitting method which is able to confine a picture quality degradation range by packet loss to a limited range, to interpolate with an approximate signal, or to correct a burst error having a long number of bits, and equipment therefor.

In order to achieve above-mentioned the object, according to the present invention, a continuous analog video signal is divided first into video block units each having a fixed length. This video block is composed of optional number of scanning lines, optional number of frames or one region when a video space is divided optionally. The video block further includes a synchronizing signal, a parity bit, an error correction code and the like as control signals. These are included in a video signal originally in addition to video data.

According to the present invention, a number of bits of a digital video signal corresponding to this video block is set so as to be integer times as large as a number of bits in an information field of a packet. Such a feature of the present invention has been heretofore unavailable.

According to the present invention, data are rearranged (referred to as shuffling) before forming the digital video signal into a packet in order to make the video transmitting method more effective. On a receiving side (regenerating portion), a video is regenerated by a reverse operation (deshuffling) of the shuffling.

The shuffling may be made at random or by classifying based on the significance of data containing rules. In that case, information showing significance of data of an information field in a packet (packet loss priority information) is stored in a header portion of a packet so that priority of a packet loss in a packet switching transmission system may be designated. In this case, it is desirable that a number of bits in a header portion of a packet having the same significance with respect to a loss is made equal to an integer multiplied by an information field bit length in the packet.

Further, it is also desirable to execute shuffling in a video block taking video regeneration after packet loss into consideration.

Next, one packet block is formed with a plurality of packets for the video block unit, a parity bit or an error correction code are formed into a packet block and added to one packet block or to each of a plurality of packet blocks. On a receiving side, video data are recovered so that picture quality degradation is not produced by using parity and error correction codes as an external code and packet loss information as an internal code.

Further, according to the present invention, the number of bits of a video block and the number of bits of an information field of a packet have a certain relationship, and a break of a video block and a break of a packet are related so as to be in accord with each other. Therefore, when a packet loss (abandonment) occurs, a position of a lost packet on a video block may be found accurately. Thus, it is possible to correct by interpolation with video data at a position having a close relationship with video information of a packet where packet loss (abandonment) has occurred.

Furthermore, since it is possible to abandon a packet having a small influence with priority in packet abandonment by having influence exerted to picture quality different in every packet by means of shuffling, degradation of picture quality may be minimized.

BRIEF DESCRIPTION OF THE DRAWINGS

FIG. 6 and FIG. 7 are both diagrams for explaining error correction in an embodiment of a video transmitting method according to the present invention.

DESCRIPTION OF THE PREFERRED EMBODIMENTS

Figure 1:
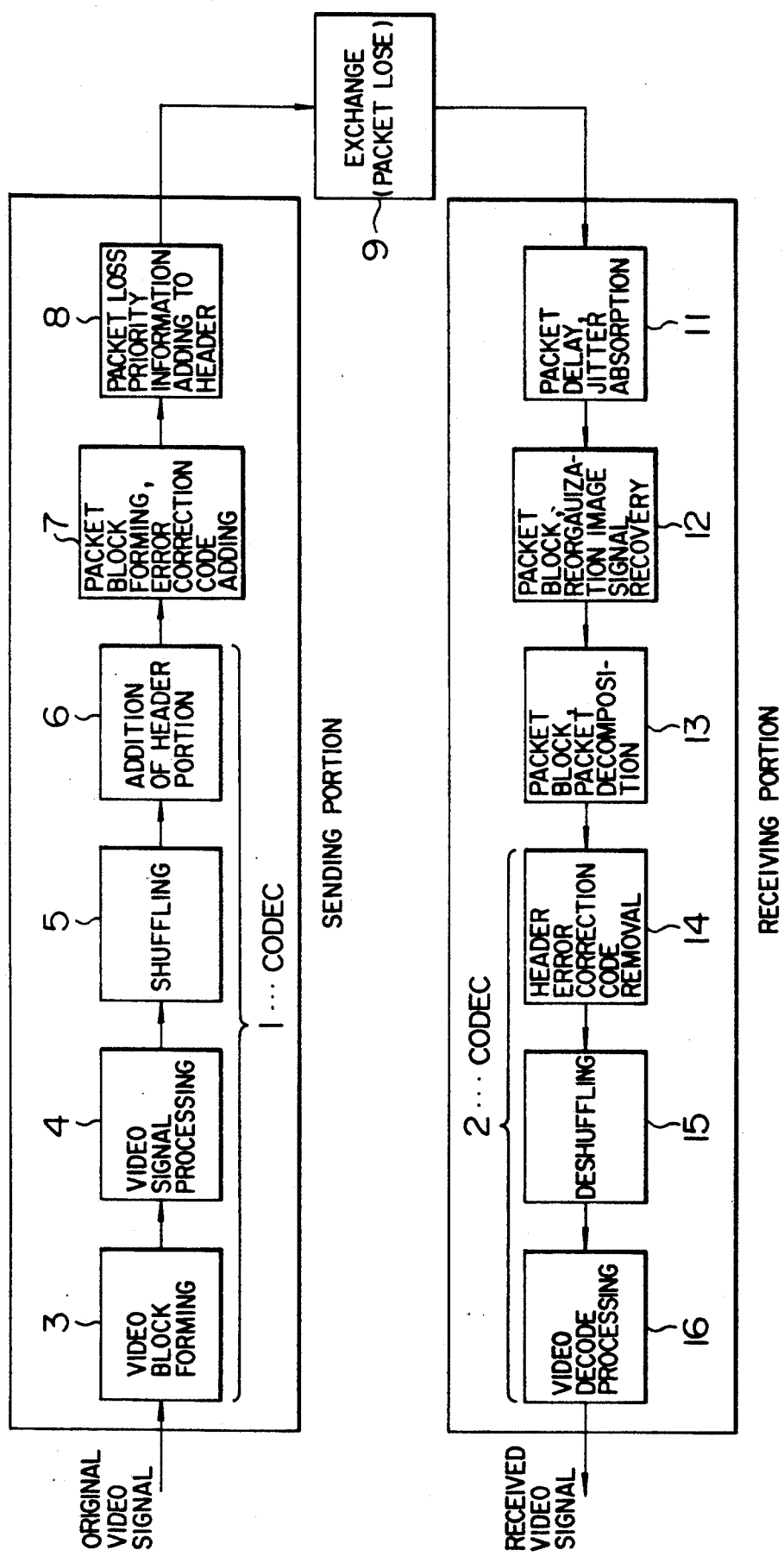
FIG. 1 is a block diagram of a video transmission system showing an embodiment of a video transmitting method according to the present invention.

FIG. 1 is a block diagram showing an embodiment of a signal transmission system for executing a video signal transmitting method according to the present invention.

In a video CODEC 1 of a sending portion, an original video signal is converted into a digital signal (4) in a video signal processing circuit after a video block is formed (3) in every horizontal scanning period. Bit positions of the digital signal are rearranged. That is, bit positions are shuffled (5). A packet number, a destination, a parity bit for correction of an error of information in a header and the like are added as a header (6) to the shuffled signal. A packet block is formed with a plurality of packets, and an error correction code for correcting an error in longitudinal data in the packet block is also formed into a packet block and added (7). A packet loss priority information is added to a header portion of each packet (8), which becomes a sending signal. The sending signal reaches a receiving portion through a transmission line (including a switch 9). In the receiving portion, after delay and jitter of a packet are absorbed first (11), a packet block formed on a sending side is reformed, and a video signal is recovered using a packet loss information from an exchange and an error correction code which has been formed into a packet block (12). Thereafter, decomposition of the packet block and the packet are performed (13), which are added to a video CODEC 2 of the receiving portion. In the video CODEC 2, an operation reverse to the operation in the video CODEC 1 of the sending portion is performed. That is, a header and a correction code are removed (14), and bit positions of a digital signal of video data are deshuffled to an original position (15) by an operation reverse to shuffling performed on a sending side. The deshuffled digital signal is converted into a receiving video signal through video decoding processing (16).

Figure 2:
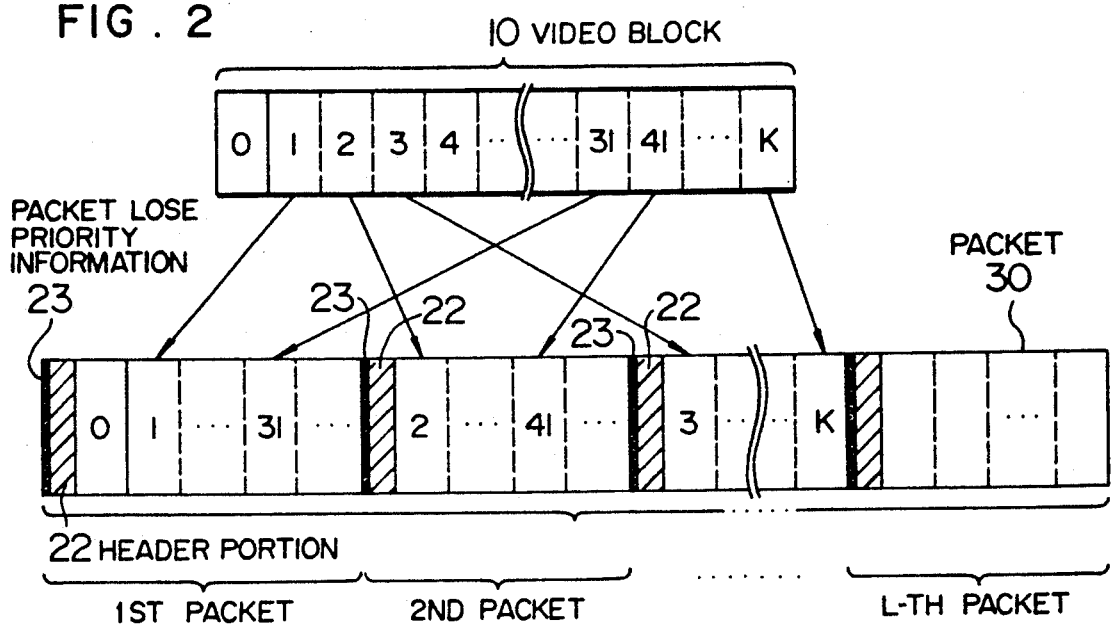
FIG. 2 through FIG. 5 are all signal format diagrams showing embodiments of a video transmitting method according to the present invention.
Figure 2:
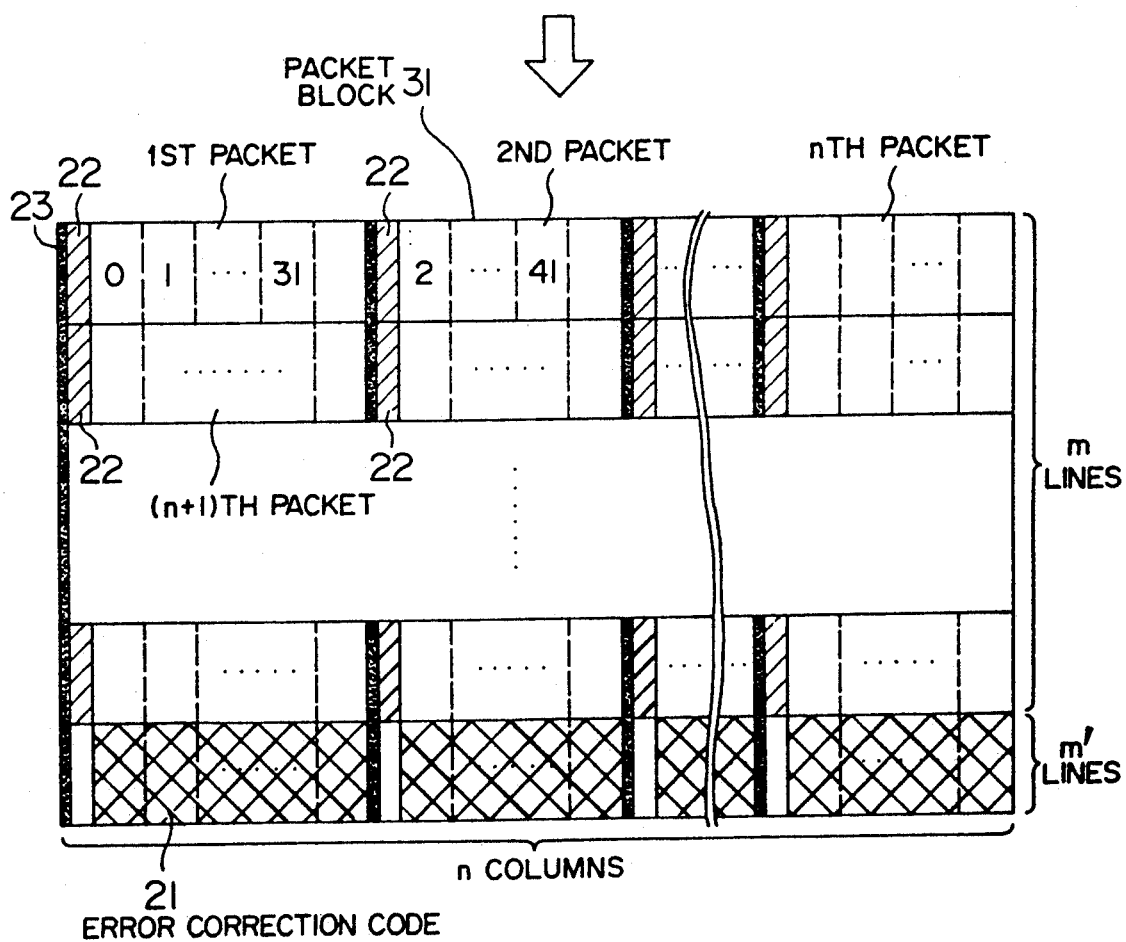

FIG. 2 shows a data format of a principal part in FIG. 1. A video block 10 obtained by dividing a series of video signals at a predetermined length is expressed with a series of video signals 0 to K including a video overhead portion included originally in a video signal and a parity bit or an error correction code, and a sampling period of an analog video signal and the number of bits of one sample are determined so that the number of bits of one video block becomes just L times (L is an integer) as large as the number of bits of an information field of a packet. An error correction code included originally in a video signal is excluded in consideration sometimes. Next, video data 0 to K of the video block data 10 are shuffled (5), thereby to arrange them in an information field of L pieces of packets 30-i (i=1, 2, 3, ..., L). The shuffling may be made at random or classified depending on the significance of the data and the attached rules. When classification is made depending on the significance of the data, information expressing the significance of the data is added to a part of a header 22 as a packet loss priority information 23 in every packet. For example, when it is assumed that the number of bits of the header 22 is 6, one bit is used for the packet loss priority information 23.

Further, the shuffling is made in the same video block taking video regeneration after packet loss.

Then, one video block data contained in L pieces of packets after shuffling are formed in a packet block 31 in m lines×n columns, and error correction codes 21 for correcting longitudinal errors of a packet block are added in an (m+1)th column and thereafter. When error correction codes of a plurality of bits m' are added, a packet block size becomes (m+m') lines×n columns.

A packet signal of a video signal thus formed is transmitted to a receiving portion through the exchange 9, but a packet is abandoned sometimes due to restriction of traffic volume and delay of a packet in an exchange. When a packet is abandoned, information on a position of a packet to be abandoned is transmitted from an exchange to a receiving portion. When a packet is abandoned, an exchange determines a packet to be abandoned by the packet loss priority information 23 in the embodiment. In this case, a packet having a small influence on picture quality of a video, that is, having the high packet loss priority, such as a packet of LSB only is abandoned with priority.

Accordingly, when a packet loss information showing that a packet in which line has been lost is obtained from the transmission exchange 9, the packet loss information is utilized as an internal code, and video data are recovered with a correction code 21 as an external code. In the present embodiment, a parity bit is used as the error correction code 21. Loss of a packet is made in a bursting manner in many cases, but burst errors up to an nth packet may be corrected by making a number n of columns of a packet block to 2 and more.

Figure 3:
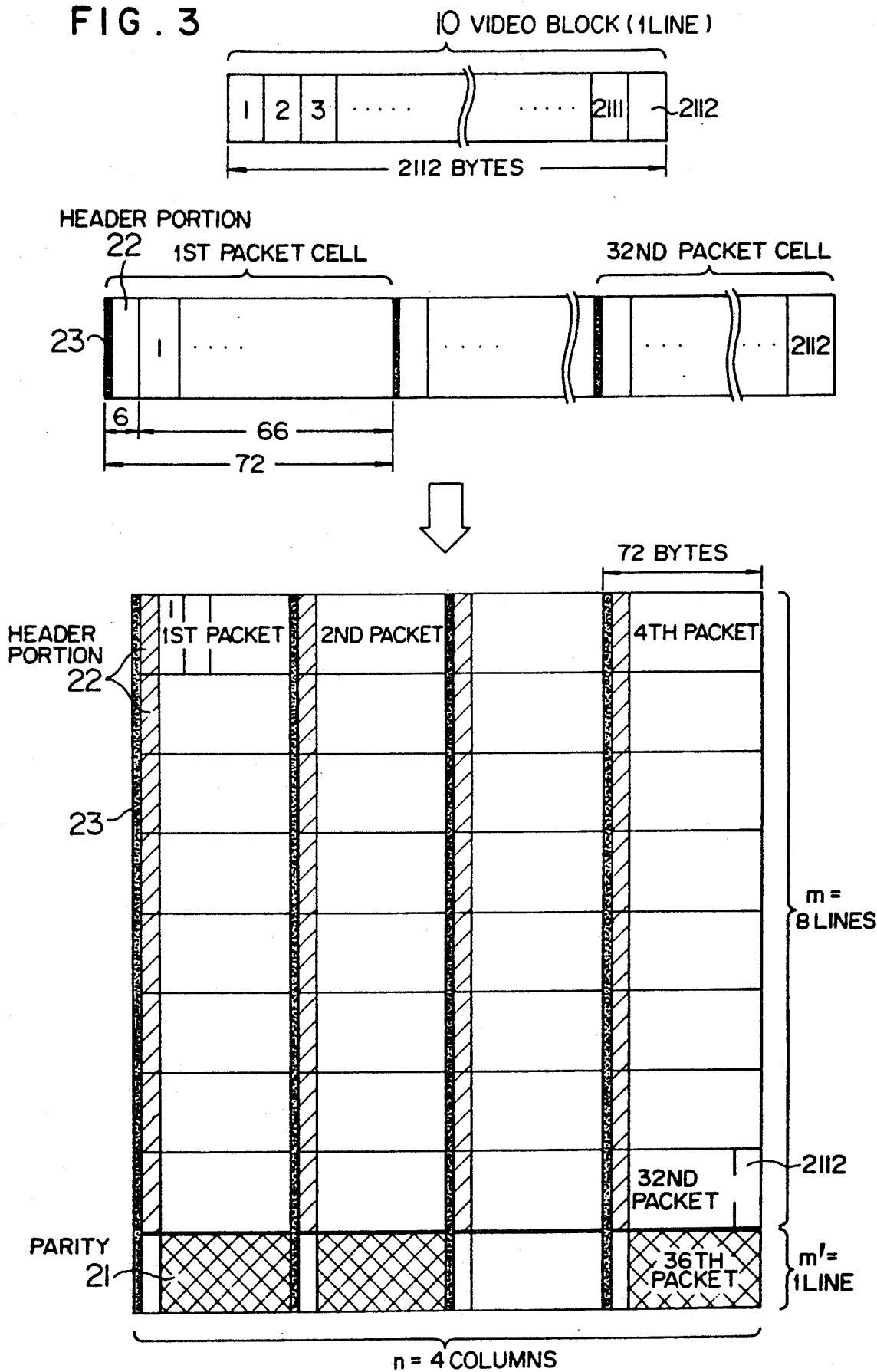

FIG. 3 shows a format showing an embodiment of a signal format in a video signal transmitting method according to the present invention. In FIG. 3, concrete numeric values are given to the embodiment in FIG. 2.

It is assumed that one line (a horizontal scanning line) of a video is one image block, and that a number of picture elements in 1 line is at 2,112 words (1 word is 1 byte=8 bits). This number of words is a value including a video overhead portion. (It is assumed that a video overhead portion includes 16 words, and video data include 2,096 words.) On the other hand, when it is assumed that a packet length includes 72 words and a header portion includes 6 words, the information field length in the packet becomes 66 words. Thus, a number L of packets required for information transmission of one video block becomes L=2112÷66=32 packets. Further, if it is assumed for example that maximum or average continuous number of packet loss generating in a bursting manner is 4 packets, it is desirable that packet block is formed in a packet block size of 8 line×4 columns at n=4, m=8. When parity bits or error correction signals 21 are added by m'=1 line, the packet block size becomes 9 lines×4 columns eventually. That is, the total number L' of packets becomes 36. Accordingly, the total packet length when one video block (72 words×36 packets=2,112 words) is formed into a packet becomes 2,112+66×4 (error correction code)+6×32 [header portion]=2,592 words. In this case, there is naturally no problem in forming a packet block composition in 36 lines×1 column at n=1 and m=36. It is possible to allocate 1 bit or 2 bits out of 6 bits of the header 22 to the packet loss priority information 23.

Figure 4A:
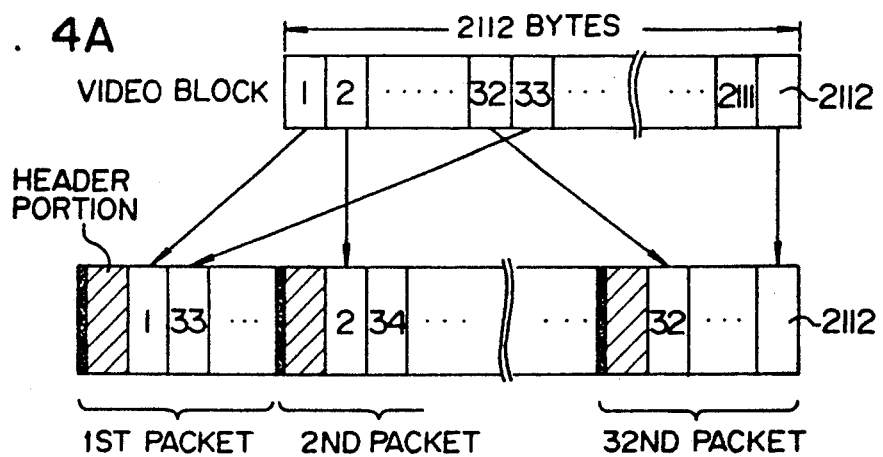
Figure 4B:
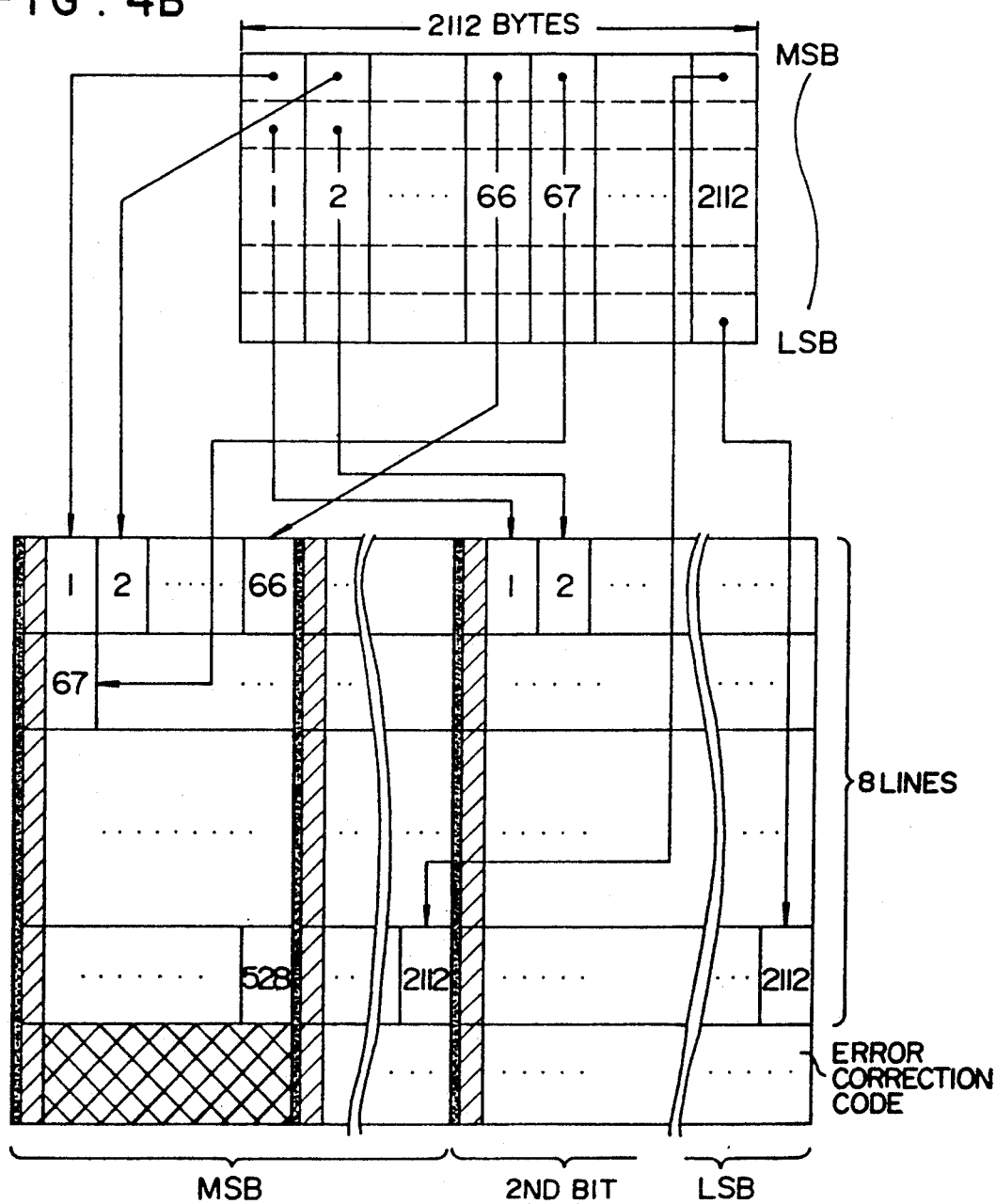

FIGS. 4A and 4B show embodiments of the shuffling method. In either case, a video of one horizontal scanning line is taken as one video block similarly to the embodiment described above. FIG. 4A shows a case dispersed in a 1st to a 32nd packets in 32 picture element unit. FIG. 4B shows a case in which 8 bits from MSB to LSB of one picture element are distributed bit No. by bit No. in 66 picture element unit. Here, a 1st to a 4th columns form MSBs, a 5th to an 8th columns form second bits, and a 29th to a 32nd columns form LSBs.

Figure 5:
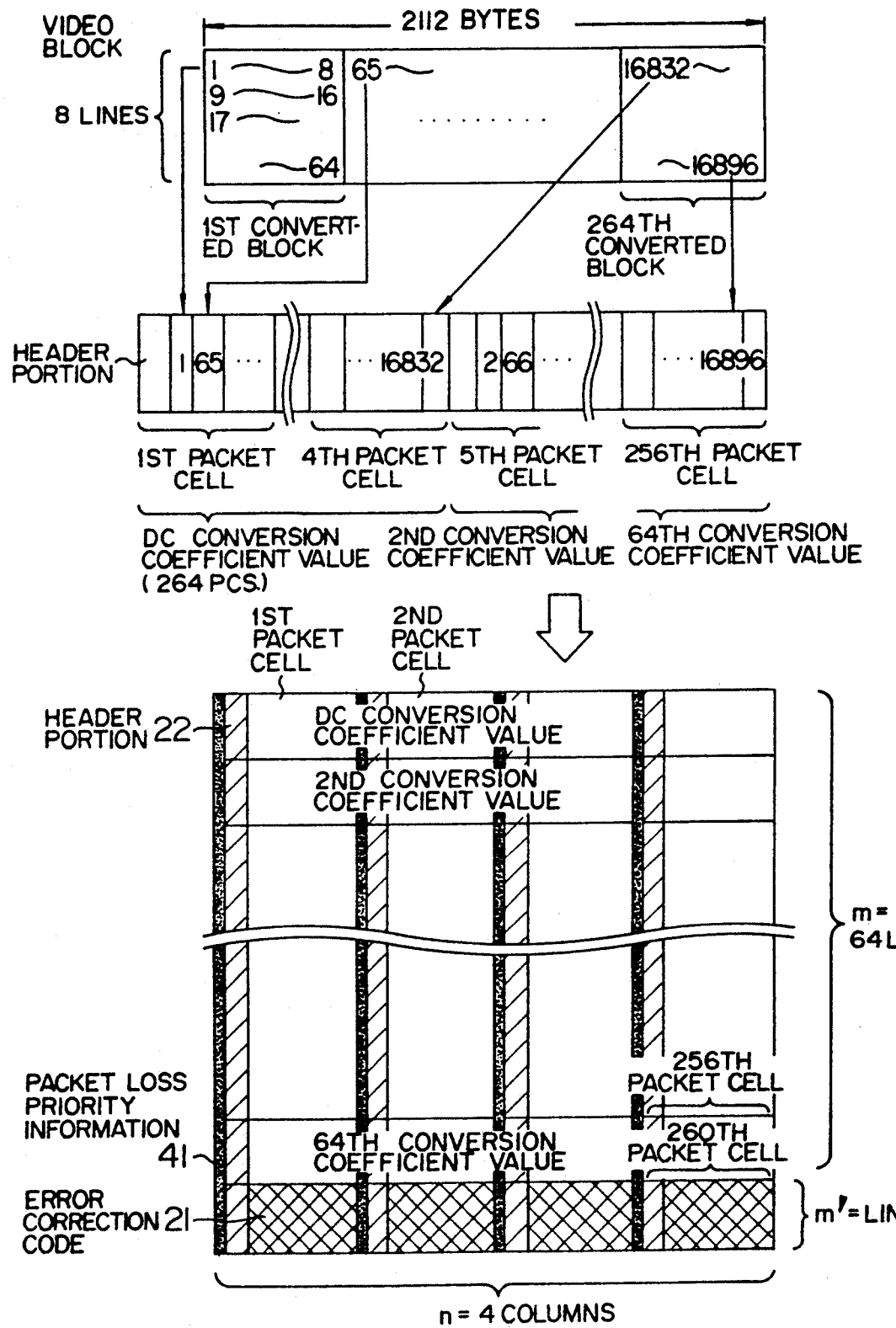

FIG. 5 shows a case in which a video signal is converted into a digital signal by conversion coding of Discrete Cosine Transform (DCT).

In conversion by DCT, a video signal is converted into a frequency in a unit of 8 lines×8 picture elements, and data composed of from a DC component to a 64th higher harmonic component are obtained. When it is assumed that 8 lines' worth of data converted by DCT are one video block formed into a packet, the total number of words becomes 2,112 words×8 lines=16,896 words assuming 1 line=2,112 words. Further, the number of converted blocks for forming into a packet becomes 16,894+64 converted data=264. A number L of packets becomes L=16,896÷66=256 assuming that the number of words of an information field of one packet is 66. This is formed as a packet block of m×n=64 lines×4 columns. When one line's worth of longitudinal error correction code 21, that is, 4 packets, are added thereto as an external code, the final number of packets becomes L'=260, which is transmitted as a packet block at n=4, m=64 and m'=1.

That is, since 264 pieces related to DC components only are generated first for 64 pieces of conversion coefficient values from converted DC components to higher-order high harmonic components, they are contained in a first to a fourth packets, conversion coefficient values with respect to the second high harmonic components are contained in a 5th to an 8th packet, thus forming a packet in a similar manner successively, and conversion coefficient values with respect to a 64th high harmonic components are contained in a 253rd to a 256th packets. In such a manner, packet blocks classified with frequency conversion degree are formed.

Here, since a DC value of a conversion coefficient is very effectual and important, a packet loss including a DC value causes sharp picture quality degradation when a video is regenerated. On the contrary, degradation is minor even if the 253rd to the 256th packets including the 64th order conversion coefficient value are lost. Accordingly, it is possible to perform selective abandonment, that is, to abandon a packet including a higher-order coefficient value having little influence exerted on picture quality when packet abandonment is required in an exchange by entering packet loss priority information 41 showing an order that packet loss is allowed to occur in a part of the header portion 22 in transmission. It becomes possible to transmit information for selective loss to a packet transmission system by adding a number showing significance of data to a header portion in a CODEC of a transmitting portion.

Next, recovery of video data for a packet block in a receiving portion will be described. A packet loss information which is sent from an exchange only has a meaning of parity which can detect an error, and cannot designate a loss position of an erroneous bit in a packet. Therefore, it has no ability of correction with this information only.

FIGS. 6A and 6B show a method of recovering a video signal when a parity code is added to an (m+1)th line. When a packet block consisting of 4 packets in 4 lines×1 column at 1 line=66 words is considered for the sake of simplicity, it can be detected that an information field in a third packet is erroneous if a packet loss information showing that a packet in a third line has been lost is input. In case a packet loss is produced, data in a lost packet are replaced with a fixed pattern sometimes in a receiving portion. In this case, it is considered that several bits among 66 pieces of data in one line of "0" and "1" are erroneous. As to this error, an error of data in a lost packet can be corrected by inspecting on a receiving side odd-even parity as an error correction code newly added in an (m+1)th line on a sending side. For example, it is found that data at (the 3rd line, the 2nd column) and at (the 3rd line, the 3rd column) are in error as shown in FIG. 6A, thus making it possible to recover data. That is, one error correction is made possible by using odd-even parity check code for both internal and external codes. In the case of FIG. 6A, however, when two lines of a packet in a third line and a packet in a fourth line are lost in succession, an inspection result showing no error is issued with a result of external code parity check only. Thus, it becomes impossible to correct an error. In particular, in the case of an ATM (packet) transmission line, it happens frequently that packets are abandoned in a bursting manner when circuit traffic starts to get higher, or packets are abandoned eventually by delay of packets for a long time. Moreover, it is considered that such a phenomenon occurs much more frequently than random errors. In this case, it is desirable that a packet block having columns in the same number as the maximum number of packet loss that are generated in a bursting manner is formed as shown in FIG. 6B. In the case of FIG. 6B, it is possible to correct continuous errors in four packet portions at the maximum.

As to a number of lines m, a proportion of a number of packets of error correction codes added as external codes becomes smaller as against the number of packets of video information when a number of lines gets larger. That is, redundancy gets smaller and transmitting efficiency is increased, but error correcting capability gets poorer. Accordingly, it is required to determine setting of a number of lines m taking redundancy with error correction codes and error correcting capability into consideration.

Figure 7:
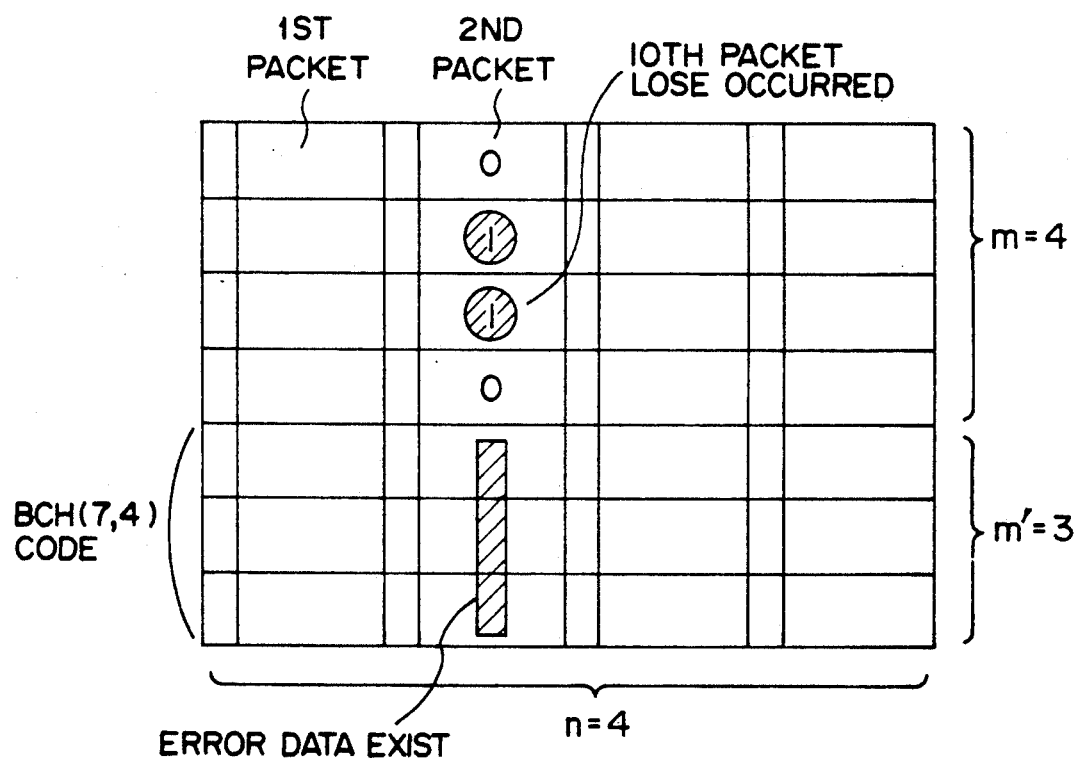

FIG. 7 shows an example in which m=4 lines and n=4 columns, and 3 bits of error correction codes are added as an external code. In the figure, an internal code is parity showing packet loss similarly to FIGS. 6A and 6B, and BCH (7, 4) code capable of one error detection and correction is used for an external code. BCH (7, 4) shows that data of 7 bits in total obtained by adding 3 bits of error correction bits to 4 bits of information bits are formed. Thus, when a packet in a third line and a second column is corrected in accordance with an external code and errors are detected thereafter, it is found that a packet in a second line and a second column is also erroneous, thus making it possible to correct two errors. It is apparent that effects obtained by using Reed Solomon or other error correction codes in place of the BCH code as an external code are exactly the same as described previously.

When bursting errors due to packet loss occur very frequently and in many cases, it is naturally impossible to correct errors even in the cases of FIGS. 6A and 6B and FIG. 7. Even in this case, however, a packet block is composed of data at portions which just form breaks of video lines or conversion blocks, etc. of DCT. Accordingly, data correction is given up and imaginary data may be produced by performing interpolation with data in packets before and behind or utilizing peripheral blocks, thus making it possible to amend a video easily and to make picture degradation inconspicuous.

We claim:

1. A video signal sending method comprising the steps of:
    dividing an analog video signal into a plurality of video blocks each corresponding to one of a plurality of regions of said analog video signal, each region of said analog video signal corresponds to one of a predetermined number of scanning lines, a predetermined number of frames, and a video space which includes a portion of said analog video signal;
    digitalizing said each video block such that a number of bits included in said each video block is equal to an integer times a number of bits included in an information field of one packet used in a packet transmission;
    shuffling data in said each video block and dividing said shuffled data into a plurality of packets each having a header and an information field;
    separating said plurality of packets into a first packet block of M lines×N columns;
    adding error correction codes which correct longitudinal errors of data included in said first packet block as an (M+1)th line thereby forming a second packet block of P lines×N columns; and
    sending said packets includes in said second packet block.

2. A sending method according to claim 1, wherein said shuffling step includes a step of entering packet loss priority information representing priority of packet loss in said header.

3. A video signal receiving method comprising the steps of:
    receiving each of a plurality of packets included in a first packet block of M line×N columns, wherein each packet includes a digital video signal and an error correction code which corrects longitudinal errors of data included in said first packet block is added to said first packet block as an (M+1)th line thereby forming a second packet block of P lines×N columns, said first packet block being formed by dividing an analog video signal into a plurality of video blocks each video block corresponding to one of a plurality of regions generated when said analog video signal is divided by a predetermined number of scanning lines, a predetermined number of frames and a video space;
    digitalizing said each video block such that a number of bits includes in said each video block is equal to an integer times a number of bits included in an information field of one packet used in a packet transmission;
    recomposing said first packet block from said received plurality of packets;
    recomposing said second packet block from said received plurality of packets;
    recovering data in said first packet block using loss information of said plurality of received packets transmitted from an exchange and said error correction code included in said second packet block;
    deshuffling digital video signals within a plurality of packets of said recovered first packet block to form a video block; and
    regenerating an analog video signal from said deshuffled digital video signals included in said video block.

4. A video signal receiving method according to claim 3, wherein said recovering step includes a step of recovering said video signal by interpolation using peripheral data of said lost packet.

5. A video signal receiving method according to claim 3, wherein said step of deshuffling includes a step of deshuffling said digital video signal after recovery.

6. A video signal transmitting and receiving method comprising:
    transmitting a video signal including the steps of:
        dividing an analog video signal into a plurality of video blocks each corresponding to one of a plurality of regions of said analog video signal, each region of said analog video signal corresponds to one of a predetermined number of scanning lines, a predetermined number of frames, and a video space which includes a portion of said analog video signal,
        digitalizing said each video block such that a number of bits included in said each video block is equal to an integer times a number of bits included in an information field of one packet used in a packet transmission,
        shuffling data in said each video block and dividing said shuffled data into a plurality of packets each having a header and an information field,
        separating said plurality of packets into a first packet block of M lines×N columns,
        adding error correction codes which correct longitudinal errors of data included in said first packet block as an (M+1)th line thereby forming a second packet block of P lines×N columns, and
        sending said packets included in said second packet block, and
    receiving a video signal including the steps of:
        receiving each of a plurality of packets, wherein said received packets are formed into a third packet block of A lines×B columns, and an error correction code which corrects longitudinal errors of data included in said third packet block is added to said third packet block as an (A+1)th line thereby forming a fourth packet block of C lines×B columns, and said third packet block being formed by dividing an analog video signal into a plurality of video blocks each video block corresponding to one of a plurality of regions generated when said analog video signal is divided by a predetermined number of scanning lines, a predetermined number of frames and a video space,
        digitalizing said each video block such that a number of bits included in said video block is equal to an integer times a number of bits included in an information field of one packet used in a packet transmission,
        recomposing said third packet block from said received plurality of packets,
        recomposing said fourth packet block from said received plurality of packets, recovering data in said third packet block using loss information of said plurality of received packets transmitted from an exchange and an error correction code included in said fourth packet block, deshuffling digital video signals within a plurality of packets of said recovered third packet block to form a video block, and regenerating an analog video signal from said deshuffled digital video signals included in said video block.

7. A transmitting method according to claim 6, wherein said step of shuffling includes a step of entering packet loss priority information which expresses priority order of a packet loss into said header.

8. A transmitting method according to claim 6, wherein said recovering step of said receiving method includes a step of recovering said video signal by interpolation using peripheral data of said lost packet.

9. A video signal sending apparatus comprising:

means for dividing an analog video signal into a plurality of video blocks each correspondingly to one of a plurality of regions of said analog video signal, each region of said analog video signal corresponds to one of a predetermined number of scanning lines, a predetermined number of frames, and a video space which includes a portion of said analog video signal;

means for digitalizing said each video block such that a number of bits included in said each video block is equal to an integer times a number of bits included in an information field of one packet used in a packet transmission;

means for shuffling data in said each said video block and dividing said shuffled data into a plurality of packets each having a header and an information field;

means for separating said plurality of packets into a first packet block of M lines×N columns;

means for adding error correction codes which correct longitudinal errors of data included in said first packet block as an (M+1)th line thereby forming a second packet block of P lines×N columns; and means for sending packets included in said second packet block.

10. A sending equipment according to claim 9, wherein said means for shuffling includes means of entering packet loss priority information which expressed priority order of packet loss in said header.

11. A video signal receiving apparatus comprising:

means for receiving each of a plurality of packets included in a first packet block of M lines×N columns, wherein each packet includes a digital video signal and an error correction code which corrects longitudinal errors of data included in said first packet block is added to said first packet block as an (M+1)th line thereby forming a second packet block of P lines×N columns, said first packet block being formed by dividing an analog video signal into a plurality of video blocks each video block corresponding to one of a plurality of regions generated when said analog video signal is divided by a predetermined number of scanning lines, a predetermined number of frames and a video space;

means for digitalizing said each video block such that a number of bits included in said each video block is equal to an integer times a number of bits included in an information field of one packet used in a packet transmission;

means for recomposing said first packet block from said received plurality of packets;

means for recomposing said second packet block from said received plurality of packets;

means for recovering data in said first packet block using loss information of said plurality of received packets transmitted from an exchange and an error correction code included in said second packet block;

means for deshuffling said digital video signals within said plurality of packets of said recovered first packet block to form a video block; and means for regenerating an analog video signal from said deshuffled digital video signals included in said video block.

12. A video signal receiving equipment according to claim 11, wherein said recovering means includes said means of recovering data by interpolation using peripheral data of said lost packet.

13. A video signal transmitting and receiving apparatus comprising:

video signal transmitting means including:

means for dividing analog video signals into a plurality of video blocks each corresponding to one of a plurality of regions of said analog video signals, each region of said analog video signals corresponds to one of a predetermined number of scanning lines, a predetermined number of frames, and a video space which includes a portion of said analog video signal, means for digitalizing said each video block such that a number of bits included in said each video block is equal to an integer times a number of bits included in an information field of one packet used in a packet transmission, means for shuffling data in said each video block and dividing said shuffled data into a plurality of packets each having a header and an information field, means for separating said plurality of packets into a first packet block of M lines×N columns, means for adding error correction codes which correct longitudinal errors of data included in said first packet block as an (M+1)th line thereby forming a second packet block of P lines×N columns, and means for sending packets included in said second packet block; and video signal receiving means including:

means for receiving each of a plurality of packets included in a third packet block of A lines×B columns, wherein each packet includes a digital video signal and an error correction code as an external code which corrects longitudinal errors of data included in said third packet block is added to said third packet block as an (M+1)th line thereby forming a fourth packet block of C lines×B columns said third packet block being formed by dividing an analog video signal into a plurality of video blocks each video block corresponding to one of a plurality of regions generated when said analog video signal is divided by a predetermined number of scanning lines, a predetermined number of frames or a video space, digitalizing said each video block such that a number of bits included in said each video block is equal to an integer times a number of bits included in an information field of one packet used in a packet transmission, means for recomposing said third packet block from said received plurality of packets, means for recomposing said fourth packet block from said received plurality of packets, means for recovering data in said third packet block using loss information of said plurality of received packets transmitted from an exchange and an error correction code included in said fourth packet block, means for deshuffling digital video signals within a plurality of packets of said recovered third packet block to form a video block, and means for regenerating an analog video signal from said deshuffled digital video signals included in said video block.

14. A transmitting equipment according to claim 13, wherein said means for shuffling of said sending means includes means of entering packet loss priority information which expresses priority order of packet loss in said header.

15. A transmitting equipment according to claim 13, wherein said recovering means of said receiving means includes means of recovering said video signal by interpolation using peripheral data of said lost packet.

* * * * *